Aug. 9, 1966 WOLF-DIETER BENSINGER ETAL 3,265,045
ROTARY-PISTON INTERNAL COMBUSTION ENGINE
OF TROCHOIDAL CONSTRUCTION
Filed Dec. 19, 1963

INVENTORS
WOLF-DIETER BENSINGER
HANS-OTTO DERNDINGER
HEINZ LAMM
WILLI SPRINGER
BY
Dicke & Craig
ATTORNEYS United States Patent Office 3,265,045
Patented August 9, 1966

3,265,045
ROTARY-PISTON INTERNAL COMBUSTION ENGINE OF TROCHOIDAL CONSTRUCTION
Wolf-Dieter Bensinger, Stuttgart-Unterturkheim, Hans-Otto Derndinger, Stuttgart-Wangen, Heinz Lamm, Stuttgart-Bad Cannstatt, and Willi Springer, Faurndau, Germany, assignors to Daimler-Benz Aktiengesellschaft, Stuttgart-Unterturkheim, Germany
Filed Dec. 19, 1963, Ser. No. 331,856
Claims priority, application Germany, Dec. 21, 1962, D 40,565
16 Claims. (Cl. 123—8)

The present invention relates to a rotary-piston internal combustion engine of trochoidal construction in which a piston rotating on the eccentric of an eccentric shaft slides with radial seals arranged at the corners thereof along the inner surfaces of an engine housing and with axial seals along the lateral parts of the housing and in which the inner seals of the axial seals consist of annularly-shaped oil seals sealing the gaps between the piston end walls and the lateral housing parts, which oil seals are securely arranged at the piston end walls and abut with sealing lips at the lateral housing parts.

With rotary-piston internal combustion engines of the type described above, the oil seal for sealing the transmission or drive mechanism space from the combustion space involves some difficulties. Heretofore, the problems involved with the oil seal were solved by means of an oil seal ring which is secured at the end wall of the piston and which abuts with a sealing lip elastically yieldingly against the side wall of the housing. By reason of the centrifugal forces acting in the direction of the eccentric of the eccentric shaft, the space within the oil seal ring is filled always with oil, and more particularly up to an opening in the side wall which is disposed in the proximity of the eccentric shaft and through which the oil can flow off. To achieve a relatively good seal against these large oil quantities is possible only by an arrangement such that the oil subjected to the effect of the centrifugal force presses against the back side of the sealing lip and thus presses the same into abutment against the lateral part with a large force whereby a rapid wear of the sealing lip is unavoidable.

The present invention aims at eliminating the loads of the oil seal rings, and in solution of the underlying problem, essentially consists in that two oil seals arranged mutually concentrically are secured at each piston wall and the piston is provided between these oil seals with an annular space open toward the lateral housing part which is subdivided into individual chambers by radial ribs. With the arrangement of two oil seals, a pre-seal is produced by the inner oil seal. Oil which passes the inner oil seal is intercepted and collected in the individual chambers of the annular space and as a result thereof, only a very low oil level is produced thereby. During rotation of the piston, the collected oil remains in the chambers for such length of time until it is finally fed or supplied to the discharge located in the lateral housing parts on the side opposite the eccentric by the influence of the decelerating forces directed inwardly within this area, if according to a further feature of the present invention, the inner oil seal has such a small diameter that individual chambers of the annular space are opened toward an aperture or opening provided within the lateral housing part. The chambers effect that over-flown or leakage oil follows the piston movements and therewith is always discharged by the alternating accelerating and decelerating forces acting at the piston, whereas with the constructions of the oil seals used heretofore in the prior art, the oil rotated with the eccentric and found no discharge possibility.

Advantageously, the sealing lip of the outer oil seal may cover the annular space approximately by one-half of its radial extent so that the oil level in the individual chambers of the annular space does not reach up to the sealing edge of the sealing lip.

In order to give a certain springiness to the sealing lip of the outer oil seal, gaps may be provided between the outer oil seal and the ribs whereby the effectiveness of the individual chambers is influenced insignificantly.

With internal combustion engines in which the piston is subdivided on the inside thereof into individual cells for the purpose of cooling by means of oil, which are filled only partly with cooling oil, according to a further feature of the present invention, the annular spaces between the inner and outer oil seals may be in communication by means of bores with the cells on the inside of the piston whereby the bores are so arranged that oil enters from the annular spaces between the oil seals into the cells located on the inside of the piston.

Accordingly, it is an object of the present invention to provide a rotary-piston internal combustion engine of trochoidal construction which obviates the aforementioned shortcomings and drawbacks encountered in the prior art constructions, particularly as regards the axial oil seals.

It is another object of the present invention to provide a rotary-piston internal combustion engine of trochoidal construction in which the axial oil seals are far-reachingly relieved from high loads by extremely simple means that are operationally reliable.

A further object of the present invention resides in the provision of a rotary-piston internal combustion engine of trochoidal construction in which the combustion space is effectively sealed from the driving space of the piston by means of simple oil seals.

Still another object of the present invention resides in the provision of a rotary-piston internal combustion engine of the type described hereinabove in which the axial oil seals not only are effectively relieved of high oil pressures, but are also so constructed and arranged as to minimize the wear and therewith increase the length of life of the engine.

A still further object of the present invention resides in the provision of an axial oil seal for rotary-piston internal combustion engines of the type described hereinabove which is not only simple in construction, but also easy to install and assures a completely satisfactory seal for sealing the combustion space against any leakage of lubricating or cooling oil that may be present within or around the piston.

Another object of the present invention resides in the provision of an axial oil seal construction for rotary-piston internal combustion engines in which the alternating accelerating and decelerating forces are utilized to cause periodic discharge of any leakage oil and therewith to prevent accumulation of large oil quantities near the oil seals.

These and other objects, features and advantages of the present invention will become more obvious from the following description when taken in connection with the accompanying drawing which shows, for purposes of illustration only, one embodiment in accordance with the present invention, and wherein.

Figure 1:
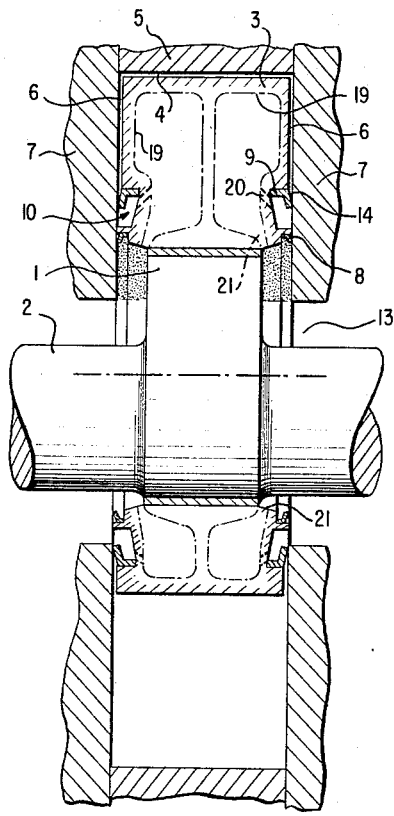
FIGURE 1 is a somewhat schematic partial longitudinal cross-sectional view through a rotary-piston internal combustion engine of trochoidal construction provided with an axial oil seal arrangement in accordance with the present invention.
Figure 2:
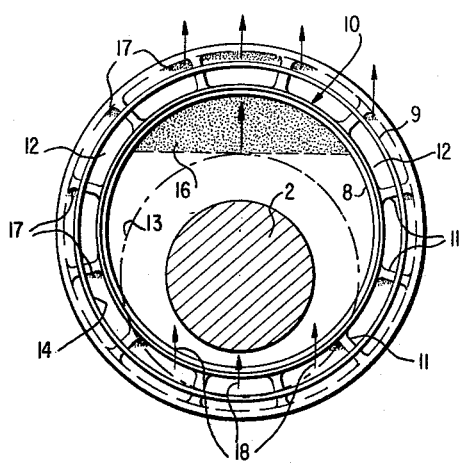
FIGURE 2 is a side elevational view of the piston used in the internal combustion engine of FIGURE 1.
Figure 3:
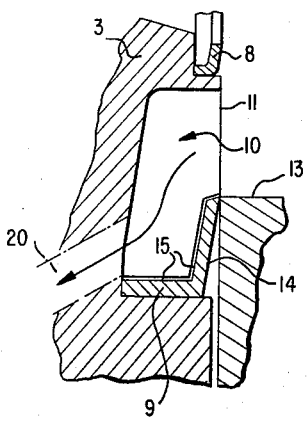
FIGURE 3 is a partial cross-sectional view, on an enlarged scale, through a part of the piston within the area of the oil seals in accordance with the present invention.

Referring now to the drawing wherein like reference numerals are used throughout the various views to designate like parts, and more particularly to FIGURE 1, reference numeral 1 designates therein the eccentric of the eccentric shaft 2. The piston 3 is rotatably supported in the usual manner on the eccentric 1, and during rotation of the eccentric 1, slides with conventional radial seals (not shown) arranged at the piston corners along the inner surfaces 4 of the engine housing 5 and with the axial seals arranged at the end walls 6 thereof along the lateral parts 7 of the housing. Of the axial seals, only the oil seals are shown herein which undertake the sealing of the transmission space from the combustion space; the other axial seals other than the oil seals may be of any conventional known construction. The oil seal consists of the inner oil seals 8 arranged at each piston end wall 6 and of the outer oil seals 9 disposed concentrically thereto. An annular space generally designated by reference numeral 10 and open in the direction toward the lateral housing part 7 is provided between the two oil seals 8 and 9 at each piston side, which annular space 10 is subdivided into individual chambers 12 by radial ribs 11 (FIGURES 2 and 3). The diameter of the inner oil seal 8 is so dimensioned that individual chambers 12 of the annular spaces 10 have periodically a communication with the openings or apertures 13 provided in the lateral parts 7 and disposed about the eccentric shaft 2. The sealing lips 14 of the outer oil seals 9 cover approximately one-half of the annular spaces 10. In order that the sealing lips 14 are able to yield elastically and springily within a certain limit, gaps 15 are provided between the sealing lips 14 and the ribs 11 as may be seen clearly from FIGURE 3.

A pre-seal is produced on each piston side by the oil seal 8 and since this oil seal has a relatively small diameter, only a small oil level 16 can occur as shown in FIGURE 2 up to the aperture 13 in the lateral part 7. Oil which has passed the oil seal 8 is now intercepted and collected in the chambers 12 behind the sealing lip 14 of the oil seal 9. Only a low oil level thereby occurs in the chambers 12 which does not reach to the sealing edge of the sealing lip 14 as indicated by reference numeral 17 in FIGURE 2. During rotation of the piston 3 on the eccentric 1, the oil moves within the chambers 12 until it can leave finally on the side opposite the eccentric in the direction of arrow 18 (FIGURE 2) through the apertures 13 in the lateral parts 7.

If cells 19 are arranged within the piston 3 for purposes of cooling by means of oil (FIGURE 1) which are filled only partially with oil, the annular spaces 10 between the oil seals 8 and 9 may be connected by way of bores 20 with the cells 19 on the inside of the piston so that the annular spaces 10 can be emptied into the piston through the bores 20. Appropriately, the bores should be located thereby in the same plane as the cooling oil bores 21 (FIGURE 1) in order that oil only leaves but does not possibly enter through the bores 20.

The gaps 15 (FIGURE 3) may be sealed possibly by yielding or elastic material. A springy or elastic ring is provided as oil seal 8. In lieu thereof, a fixed relatively small gap is also satisfactory under certain circumstances by means of which the piston rotates at the housing. This place may also serve for the axial guidance.

While we have shown and described one embodiment in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:
1. A rotary-piston internal combustion engine of trochoidal construction, comprising:
 housing means including lateral housing parts,
 an eccentric shaft provided with eccentric means,
 polygonal piston means rotatably arranged on said eccentric means and including axial seal means, said piston means sliding with the axial seal means thereof along the lateral housing part,
 said axial seal means including annularly-shaped oil seal means effectively sealing the gaps between the piston end walls and the lateral housing parts,
 said oil seal means being securely arranged at the piston end walls and each including two concentrically arranged oil seals at each piston end wall,
 the piston means being provided with an annular space between two concentrically arranged oil seals open in the direction toward the respective lateral housing part, and said annular space being subdivided into individual chambers by radial ribs provided on the piston means.

2. A rotary-piston internal combustion engine of trochoidal construction, comprising:
 housing means including lateral housing parts,
 an eccentric shaft provided with eccentric means,
 polygonal piston means rotatably arranged on said eccentric means and including axial seal means, said piston means sliding with the axial seal means thereof along the lateral housing part,
 said axial seal means including annularly-shaped oil seal means effectively sealing the gaps between the piston end walls and the lateral housing parts,
 said oil seal means being securely arranged at the piston end walls and each including two concentrically arranged oil seals at each piston end wall,
 the piston means being provided with an annular space between two concentrically arranged oil seals open in the direction toward the respective lateral housing part, and said annular space being subdivided into individual chambers by radial ribs provided on the piston means,
 the lateral housing parts being provided within the area of the eccentric shaft with aperture means for the discharge of oil,
 the inner oil seal having such a small diameter that individual chambers of the annular space are open in the direction toward said aperture means.

3. A rotary-piston internal combustion engine of trochoidal construction, comprising:
 housing means including lateral housing parts,
 an eccentric shaft provided with eccentric means,
 polygonal piston means rotatably arranged on said eccentric means and including axial seal means, said piston means sliding with the axial seal means thereof along the lateral housing part,
 said axial seal means including annularly-shaped oil seal means effectively sealing the gaps between the piston end walls and the lateral housing parts,
 said oil seal means being securely arranged at the piston end walls and each including two concentrically arranged oil seals at each piston end wall,
 the piston means being provided with an annular space between two concentrically arranged oil seals open in the direction toward the respective lateral housing part, and said annular space being subdivided into individual chambers by radial ribs provided on the piston means,
 the outer oil seal being provided with a sealing lip covering approximately one-half of the annular space.

4. A rotary-piston internal combustion engine of trochoidal construction, comprising:
 housing means including lateral housing parts,
 an eccentric shaft provided with eccentric means,
 polygonal piston means rotatably arranged on said eccentric means and including axial seal means, said piston means sliding with the axial seal means thereof along the lateral housing part,
 said axial seal means including annularly-shaped oil seal means effectively sealing the gaps between the piston end walls and the lateral housing parts, said oil seal means being securely arranged at the piston end walls and each including two concentrically arranged oil seals at each piston end wall, the piston means being provided with an annular space between two concentrically arranged oil seals open in the direction toward the respective lateral housing part, and said annular space being subdivided into individual chambers by radial ribs provided on the piston means, gaps being provided between the outer oil seal and the ribs.

5. A rotary-piston internal combustion engine of trochoidal construction, comprising:

housing means including lateral housing parts, an eccentric shaft provided with eccentric means, polygonal piston means rotatably arranged on said eccentric means and including axial seal means, said piston means sliding with the axial seal means thereof along the lateral housing part, said axial seal means including annularly-shaped oil seal means effectively sealing the gaps between the piston end walls and the lateral housing parts, said oil seal means being securely arranged at the piston end walls and each including two concentrically arranged oil seals at each piston end wall, the piston means being provided with an annular space between two concentrically arranged oil seals open in the direction toward the respective lateral housing part, and said annular space being subdivided into individual chambers by radial ribs provided on the piston means, the piston means being subdivided on the inside thereof into individual cells to enable cooling by means of oil, and bore means provided within said piston means to establish a communication between said annular spaces and the cells, said bore means being so arranged and located that oil is able to enter during operation effectively only into the cells out of said annular spaces.

6. A rotary-piston internal combustion engine of trochoidal construction, comprising:

housing means provided with internal surface means and including lateral housing parts, an eccentric shaft provided with eccentric means, polygonal piston means rotatably arranged on said eccentric means and including axial and radial seal means, said piston means sliding with the radial seals arranged at the piston corners along said inner surface means and with the axial seal means thereof along the lateral housing part, said axial seal means including annularly-shaped oil seal means effectively sealing the gaps between the piston end walls and the lateral housing parts, said oil seal means being securely arranged at the piston end walls and each including two concentrically arranged oil seals at each piston end wall, the piston means being provided with an annular space between two concentrically arranged oil seals open in the direction toward the respective lateral housing part, and said annular space being subdivided into individual chambers by radial ribs provided on the piston means, the lateral housing parts being provided within the area of the eccentric shaft with aperture means for the discharge of oil, the inner oil seal having such a small diameter that individual chambers of the annular space are open in the direction toward said aperture means, the outer oil seal being provided with a sealing lip covering approximately one-half of the annular space, gaps being provided between the outer oil seal and the ribs, the piston means being subdivided on the inside thereof into individual cells to enable cooling by means of oil, and bore means provided within said piston means to establish a communication between said annular spaces and the cells, said bore means being so arranged and located that oil is able to enter during operation effectively only into the cells out of said annular spaces.

7. A rotary-piston internal combustion engine of trochoidal construction, comprising:

housing means including lateral housing parts, an eccentric shaft provided with eccentric means, polygonal piston means rotatably arranged on said eccentric means and including axial seal means, said piston means sliding with the axial seal means thereof along the lateral housing part, said axial seal means including annularly-shaped oil seal means effectively sealing the gaps between the piston end walls and the lateral housing parts, said oil seal means being securely arranged at the piston end walls and each including two concentrically arranged oil seals at each piston end wall, the piston means being provided with an annular space between two concentrically arranged oil seals open in the direction toward the respective lateral housing part, and said annular space being subdivided into individual chambers by radial ribs provided on the piston means, the lateral housing parts being provided within the area of the eccentric shaft with aperture means for the discharge of oil, the inner oil seal having such a small diameter that individual chambers of the annular space are open in the direction toward said aperture means, the outer oil seal being provided with a sealing lip covering approximately one-half of the annular space.

8. A rotary-piston internal combustion engine of trochoidal construction, comprising:

housing means including lateral housing parts, an eccentric shaft provided with eccentric means, polygonal piston means rotatably arranged on said eccentric means and including axial seal means, said piston means sliding with the axial seal means thereof along the lateral housing part, said axial seal means including annularly-shaped oil seal means effectively sealing the gaps between the piston end walls and the lateral housing parts, said oil seal means being securely arranged at the piston end walls and each including two concentrically arranged oil seals at each piston end wall, the piston means being provided with an annular space between two concentrically arranged oil seals open in the direction toward the respective lateral housing part, and said annular space being subdivided into individual chambers by radial ribs provided on the piston means, the lateral housing parts being provided within the area of the eccentric shaft with aperture means for the discharge of oil, the inner oil seal having such a small diameter that individual chambers of the annular space are open in the direction toward said aperture means, the outer oil seal being provided with a sealing lip covering approximately one-half of the annular space, gaps being provided between the outer oil seal and the ribs.

9. In a rotary-piston internal combustion engine of trochoidal construction in which a polygonal piston rotates on the eccentric of an eccentric shaft and slides with radial seals arranged at the piston corners along the inner surfaces of the engine housing and with axial seal arrangements along the lateral housing parts, and in which the inner seals of the axial seal arrangements consists of annularly-shaped oil seals effective to seal the gaps between the piston end walls and the lateral housing parts, said oil seals being securely arranged at the piston end walls and abutting with the sealing lips against the lateral housing parts, the improvement essentially consisting of two concentrically arranged oils seals secured at each piston end wall and forming said oil seal, the piston being provided with an annular space within the area of the two concentrically arranged oil seals open in the direction toward the respective lateral housing part, and the annular space being subdivided into individual chambers, the lateral housing parts being provided within the area of the eccentric shaft with apertures for the discharge of oil.

10. In a rotary-piston internal combustion engine of trochoidal construction in which a polygonal piston rotates on the eccentric of an eccentric shaft and slides with radial seals arranged at the piston corners along the inner surfaces of the engine housing and with axial seal arrangements along the lateral housing parts, and in which the inner seals of the axial seal arrangements consists of annularly-shaped oil seals effective to seal gaps between the piston end walls and the lateral housing parts, said oil seals being securely arranged at the piston end walls and abutting with the sealing lips against the lateral housing parts, the improvement essentially consisting of two concentrically arranged oil seals secured at each piston end wall and forming said oil seal, the piston being provided with an annular space within the area of the two concentrically arranged oil seals open in the direction toward the respective lateral housing part, and the annular space being subdivided into individual chambers, the lateral housing parts being provided within the area of the eccentric shaft with apertures for the discharge of oil, and the inner one of said two concentrically arranged oil seals being disposed along such a diameter that individual chambers of the annular space periodically communicate with the apertures provided in the lateral housing part.

11. In a rotary-piston internal combustion engine of trochoidal construction in which a polygonal piston rotates on the eccentric of an eccentric shaft and slides with radial seals arranged at the piston corners along the inner surfaces of the engine housing and with axial seal structures along the lateral housing parts, and in which the inner seals of the axial seal structures consist of annularly-shaped oil seals sealing the gaps between the piston end walls and the lateral housing parts, said oil seals being securely arranged at the piston end walls and abutting with the sealing lips against the lateral housing parts, the improvement essentially consisting of means forming an essentially annular space disposed within at least one end wall of the piston and subdivided with a plurality of oil spaces and seal means for sealing said annular space in the radially inner and outer areas thereof while leaving the same open in a direction toward the respective lateral housing part.

12. In a rotary-piston internal combustion engine of trochoidal contsruction in which a polygonal piston rotates on the eccentric of an eccentric shaft and slides with radial seals arranged at the piston corners along the inner surfaces of the engine housing and with axial seal structures along the lateral housing parts, and in which the inner seals of the axial seal structures consists of annularly-shaped oil seals sealing the gaps between the piston end walls and the lateral housing parts, said oil seals being securely arranged at the piston end walls and abutting with the sealing lips against the lateral housing parts, the improvement essentially consisting of means forming an essentially annular space disposed within at least one end wall of the piston and subdivided with a plurality of oil spaces, and seal means for sealing said annular space in the radially inner and outer areas thereof while leaving the same open in a direction toward the respective lateral housing part, and means for producing a discharge of oil accumulating within the oil spaces through the lateral housing part in an approximately radially inwardly directed sense.

13. In a rotary-piston internal combustion engine of trochoidal construction in which a polygonal piston rotates on the eccentric of an eccentric shaft and slides with radial seals arranged at the piston corners along the inner surfaces of the engine housing and with axial seal arrangements along the lateral housing parts, and in which the inner seals of the axial seal arrangements consists of annularly-shaped oil seals effective to seal the gaps between the piston end walls and the lateral housing parts, said oil seals being securely arranged at the piston end walls and abutting with the sealing lips against the lateral housing parts, the improvement essentially consisting of two concentrically arranged oil seals secured at each piston end wall and forming said oil seal, the piston being provided with an annular space within the area of the two concentrically arranged oil seals open in the direction toward the respective lateral housing part, and the annular space being subdivided into individual chambers, the lateral housing parts being provided within the area of the eccentric shaft with apertures for the discharge of oil, means to enable elastic yielding of the outer one of the concentrically arranged oil seals.

14. In a rotary-piston internal combustion engine of trochoidal construction in which a polygonal piston rotates on the eccentric of an eccentric shaft and slides with radial seals arranged at the piston corners along the inner surfaces of the engine housing and with axial seal arrangements along the lateral housing parts, and in which the inner seals of the axial seal arrangements consists of annularly-shaped oil seals effective to seal the gaps between the piston end walls and the lateral housing parts, said oil seals being securely arranged at the piston end walls and abutting with the sealing lips against the lateral housing parts, the improvement essentially consisting of two concentrically arranged oil seals secured at each piston end wall and forming said oil seal, the piston being provided with an annular space within the area of the two concentrically arranged oil seals open in the direction toward the respective lateral housing part, and the annular space being subdivided into individual chambers, the lateral housing parts being provided within the area of the eccentric shaft with apertures for the discharge of oil, means forming on the inside of the piston individual cooling spaces for cooling oil, and means in the piston for interconnecting the annular spaces with said cooling spaces to enable the discharge of oil from the annular spaces into the cooling spaces.

15. In a rotary-piston internal combustion engine of troshoidal construction in which a polygonal piston rotates on the eccentric of an eccentric shaft and slides with radial seals arranged at the piston corners along the inner surfaces of the engine housing and with axial seal arrangements along the lateral housing parts, and in which the inner seals of the axial seal arrangement consists of annularly-shaped oil seals effective to seal the gaps between the piston end walls and the lateral housing parts, said oil seals being securely arranged at the piston end walls and abutting with the sealing lips against the lateral housing parts, the improvement essentially consisting of two concentrically arranged oil seals secured at each piston end wall and forming said oil seal, the piston being provided with an annular space within the area of the two concentrically arranged oil seals open in the direction toward the respective lateral housing part, and the annular space being subdivided into individual chambers, the lateral housing parts being provided within the area of the eccentric shaft with apertures for the discharge of oil, means to enable elastic yielding of the outer one of the concentrically arranged oil seals, means forming on the inside of the piston individual cooling spaces for cooling oil, and means in the piston for interconnecting the annular spaces with said cooling spaces to enable the discharge of oil from the annular spaces into the cooling spaces.

16. In a rotary-piston internal combustion engine of trochoidal construction in which a polygonal piston rotates on the eccentric of an eccentric shaft and slides with radial seals arranged at the piston corners along the inner surfaces of the engine housing and with axial seal arrangements along the lateral housing parts, and in which the inner seals of the axials seal arrangements consists of annularly-shaped oil seals effective to seal the gaps between the piston end walls and the lateral housing parts, said oil seals being securely arranged at the piston end walls and abutting with the sealing lips against the lateral housing parts, the improvement essentially consisting of two concentrically arranged oil seals secured at each piston end wall and forming said oil seal, the piston being provided with an annular space within the area of the two concentrically arranged oil seals open in the direction toward the respective lateral housing part, and the annular space being subdivided into individual chambers, the lateral housing parts being provided within the area of the eccentric shaft with apertures for the discharge of oil, and the inner one of said two concentrically arranged oil seals being disposed along such a diameter that individual chambers of the annular space periodically communicate with the apertures provided in the lateral housing part, the outer one of said concentrically arranged oil seals covering with the sealing lip thereof approximately one-half of the corresponding annular space, means to enable elastic yielding of the outer one of the concentrically arranged oil seals, means forming on the inside of the piston individual cooling spaces for cooling oil, and means in the piston for interconnecting the annular spaces with said cooling spaces to enable the discharge of oil from the annular spaces into the cooling spaces.

No references cited.

MARK M. NEWMAN, *Primary Examiner.*

F. T. SADLER, *Assistant Examiner.*